Feb. 22, 1949.  H. V. JUNGST  2,462,403
CAMBER ADJUSTING TOOL
Filed Aug. 6, 1945
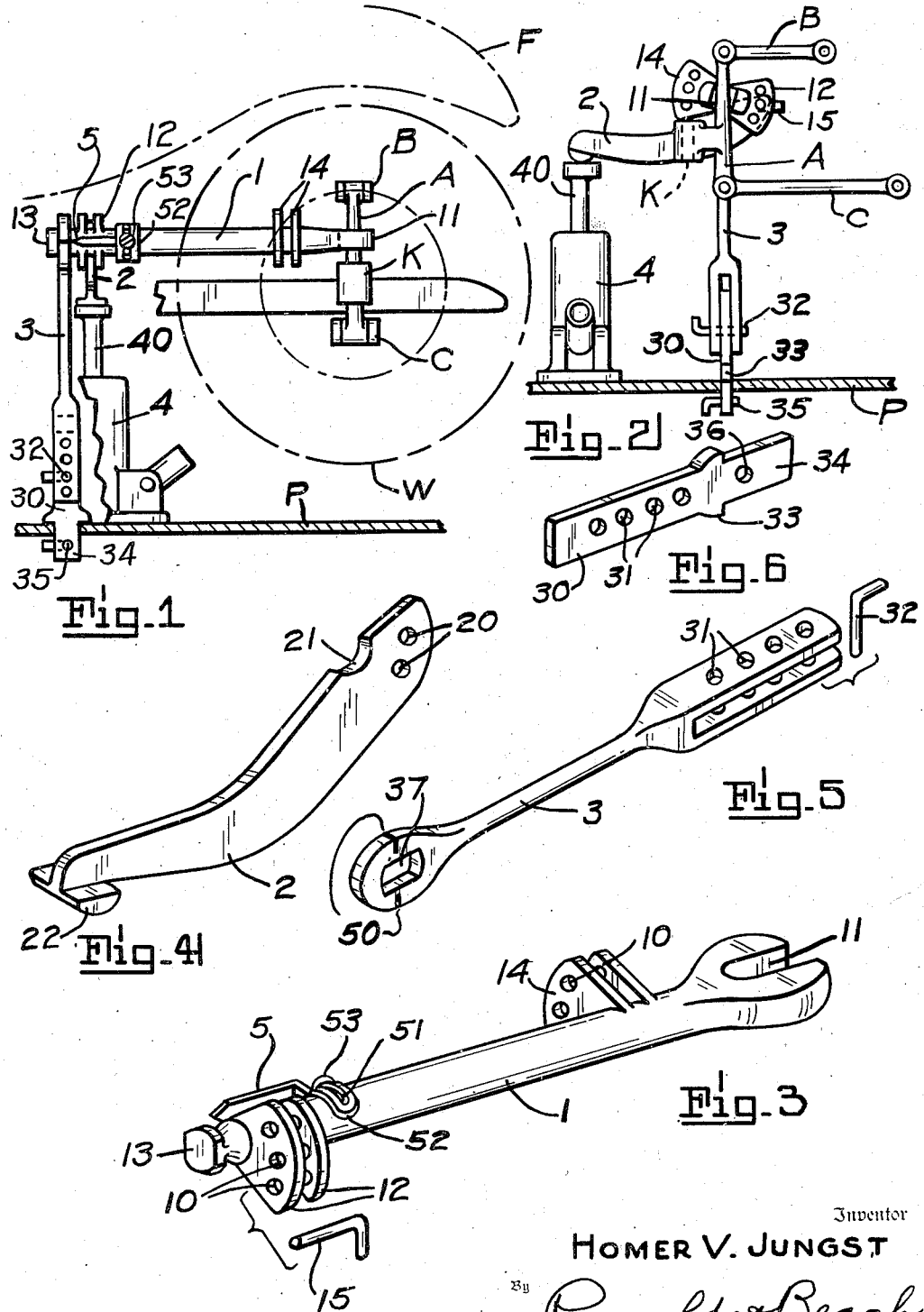
Inventor
HOMER V. JUNGST
By Reynolds+Beach
Attorneys Patented Feb. 22, 1949

2,462,403

UNITED STATES PATENT OFFICE 2,462,403

CAMBER ADJUSTING TOOL

Homer V. Jungst, Seattle, Wash.; Mary J. Jungst executrix of said Homer V. Jungst, deceased Application August 6, 1945, Serial No. 609,177

13 Claims. (Cl. 153—32)

1

The adjustment of camber in the steerable wheels (usually the front wheels, and so designated hereafter) of automotive vehicles is and has always been of extreme importance, not only to trouble-free, safe operation of the vehicle, but also to the avoidance of tire wear. Independent spring suspension of the front wheels, or so called knee-action, has rendered obsolete old tools and methods of adjusting camber, wherein the adjustment was accomplished by bending the axle itself one way or the other. The spindles are now carried by a spindle support arm, which extends vertically between the two laterally projecting, generally horizontal arms or links by which it is mounted upon the frame. Provision is usually made in such mountings for a small amount of camber adjustment, but this is of such limited range, and is usually adjusted at the factory to the limit, that there is left no further adjustability, or insufficient adjustability, when required in the field. The range of such adjustment is so slight that it will not accommodate adjustments to the extent often necessary after accidents, or to compensate for extensive wear. Accordingly, such camber adjustments as are normally required in the field are usually accomplished by bending the spindle supporting arm, and the attempt is always to bend such arm so accurately that no necessity remains for making any fine adjustment by manipulating the built-in adjusting means, for this at best is not an easy operation.

The independent spring suspensions for the front wheels, and companion improvements, have introduced in the wheel mounting and assembly various elements, such as rubber bumpers, levers, flexible brake conduits, sway braces, and other mechanism, so compactly located and assembled as to make access to the steering spindle support arm difficult, and particularly is it difficult to apply a bending device to the spindle support arm, which is strong enough and securely, quickly, and easily enough mountable to effect the desired cold bending of such spindle support arm. Moreover, the space is so encumbered by the devices indicated, which form part of the steering system and brake system, that there is not readily available sufficient room for the required bending movement of such a bending bar.

The repair man is thus faced with the problem, with bending bars of the type heretofore known, of dismounting a not inconsiderable part of the mechanism, for proper engagement and freedom of movement of the bending bar, or in the al-

2 ternative of using heat to soften the steering knuckle so that it will bend more easily with less effort and less movement of the bending bar. Heating of such a steering knuckle is inherently disadvantageous, for it weakens it, and entails the further disadvantage that the heat, in a crowded space such as this, cannot be properly controlled, and is liable to burn or seriously damage rubber bumpers, brake fluid hoses, and the like, and to take the temper out of springs or other structural parts. Nor is dismounting of vehicle parts desirable, for an excessive amount of time is consumed in the dismounting, remounting, and readjusting of such parts.

It is the primary object of the present invention to provide a tool whereby cold bending of such a spindle support arm may be accomplished without the dismounting of any part of the vehicle, ordinarily not even the wheel itself, and by which, therefore, a bending operation can be done easily and in a fraction of the time heretofore required.

It is a further disadvantage of bending mechanism for the operation described, such as has been heretofore available, that while the camber might be increased, it was only with the greatest of difficulty that it might be decreased, and to effect a decreasing operation, if the increasing operation had produced too great a bend, as was not infrequently the case, it was necessary to dismount the entire tool and to reassemble it in a different operative position upon the spindle support arm. This all takes time, and adds materially to the cost of the operation. It is a further object of the present invention to provide a tool which, without dismounting, and with but slight rearrangement, hence with a minimum of time consumed, may accomplish either an increase or a decrease in the wheel's camber, to the further end that the workman will not be tempted to overlook, for instance, a slightly excessive amount of camber, which should be decreased, but which, when the operation of decreasing is difficult, he may not take the time or trouble to do.

Also it is an object to provide a tool of such nature that it can be held in operative position without difficulty, and will adjust camber without disturbing the caster adjustment.

It is also an object to provide gauge means, incorporated in such a tool, by which the operator may determine the point to which the bending has progressed, so that, after gauging, he may restore parts to that zero position and accomplish such additional bending, in either direction, as the gauging has indicated to be necessary.

It is also an object of the invention to provide a tool of the nature indicated which shall be of simple construction, rugged, and adapted by simple adjustments to various makes of cars and types of steering systems or wheel suspensions.

The provision of a tool of this nature which can be applied by the operator while in a comfortable position, and hence which can be applied easily and quickly, is a further object.

With these and other objects in mind, as will become apparent as the specification progresses, the invention comprises the novel tool and the novel parts thereof, in combination, as shown in the accompanying drawings in an illustrative form, and as is more particularly described and defined in this specification and in the claims which terminate the same.

Figure 1 is a side elevation of the tool, shown applied to the spindle support arm of an automobile, and Figure 2 is a front elevation of the same.

Figure 3 is a perspective view of the torque bar, looking at its underside, and Figure 4 is a similar view of the associated lever arm for securement to the torque bar.

Figure 5 is perspective view of the upper part, and Figure 6 is a perspective view of the lower part, of the two-part hold-down link.

In the drawings the tool is shown applied to the right front spindle support arm A. This spindle support arm is pivotally supported at its upper end by a short link B, and its lower end is pivotally supported by a longer link C, both of which are pivoted at their inner ends upon the automobile frame structure (not shown). Further details of the automobile structure have been omitted, for they are conventional, and in themselves form no part of the present invention. As is well known, however, the frame structure projects into the space between the links B and C, and there are, in or near this space and the parts shown, such structural elements as the frame, rubber bumpers thereon, and outwardly of the spindle support arm A, there is the spindle itself, the brake drum, brake operating mechanism including a brake fluid conduit, and the like. Sway braces engage the frame close to the spindle support arm. Overall is the fender F, shown in Figure 1, and outside of all is the demountable wheel and tire W. The steering knuckle, steering arm, drag link, and similar parts, further clutter the space in the immediate vicinity of the spindle support arm A.

For the correction of camber it is advantageous to run the automobile upon an elevated platform P, and to jack it up so that the wheel W of that spindle support arm A which requires adjustment is raised off the platform. The platform in this instance takes the form of a steel plate or runway. Though ordinarily the wheel need not be removed, and is needed in place for gauging. In some cases it may be desirable to remove the wheel, in order to determine the adjusted position of the built-in camber adjusting device, in order to determine if it can be turned back to a lesser adjustment, and thus to avoid the necessity of bending, assuming that a camber gauge has shown the need for increased camber. This built-in adjustment is usually a part of the pivot between the upper link B and the upper end of the spindle support arm. Removal of the wheel is unnecessary to enable fitting the bending device in place, or to enable its use, and removal of other parts is not at all necessary, nor desirable.

A torque bar 1 is intended to be disposed horizontally in use, and extending in a forward and rearward direction.

While it might extend forwardly, it has been found most advantageous to extend it rearwardly. Its forward end is slotted or forked, inwardly from the end, as indicated at 11, to straddle the spindle support arm A, so that the arm A is engaged at two vertically spaced points at respectively opposite side of the arm.

It is wholly unnecessary to clamp the spindle arm A; to do so requires dismounting of many parts accessory to the wheel, and requires the expenditure of much time and effort, all of which is avoided, in the present device, because the torque bar is otherwise supported (as will later appear) in such manner that it cannot well become disengaged from the spindle support arm A during bending.

As best shown in Figure 2, for the camber increasing operation assumed to be necessary, the engagement of the torque bar 1 with the outer side of the arm A lies above the torque bar's point of engagement with the inner side of the arm A, and both these points lie above the king post bracket K which is a part of the arm A. These points of engagement should be as near the upper end of the spindle support arm as possible, for here it is thinnest and bends most easily.

To support the opposite end of the torque bar 1, and to prevent its disengagement from the spindle support arm A, hold-down means are provided, and these may in general take any desired form, and may be connected to the torque bar in various ways. Conveniently such hold-down means are formed in two parts 3 and 30, these two parts being held together adjustably as to length, and pivotally about an axis transversely of the car, by the holes 31 and the pin 32. Seats 33 separate the lower portion 30 into two parts, of which the lower part 34 may project through an aperture in the plate of platform P, and it is held against upward tension by a pin 35 received in a hole 36.

At its upper end the upper part 3 of the hold-down means is provided with an aperture 37, which is preferably elongated, as shown, to engage over a complementally shaped but somewhat rotated head 13 on the torque bar 1. The hold-down means then supports the end of the torque bar which is opposite its forked end from dropping down, also holds it against an upward pull, and their interengagement prevents separation endwise of the bar 1. By suitable adjustment the torque bar 1 may be kept substantially level, regardless of the elevation of the spindle support arm A. Since the pivot axis defined by the pin 32 is transverse relative to the car, the upper part 3 may swing down upon the runway P to enable a car to run on or off, and when the part 3 is engaged with the torque bar, torque-induced forces therein tending to rock the link 3, 30 transversely are adequately resisted.

Connected to and projecting laterally from the torque bar 1 is a lever arm 2. This lever arm conceivably may be a permanent part of the torque arm, but for convenience of assembly and operative positioning, as well as for convenience of storage, it is preferred that the lever arm 2 be separable from the torque bar 1. Accordingly, the torque bar is provided with anchorage means, somewhat outstanding from the axis of the torque bar, for the securement of the lever arm 2. These anchorage means, as shown, take the form of paired ears 12 and 14 projecting one pair to one side and the other pair to the opposite side of the torque bar, and spaced lengthwise thereof. Each set of ears is provided with apertures 10 for the reception of a pin 15, which also passes through one of the apertures 20 in the lever arm 2. From this point of securement, outwardly of the axis of the torque bar, the lever 2 extends beneath the bar, where it is fulcrumed at 21 upon the bar, and thence generally laterally outwardly at the opposite side of the torque bar to a terminus such as the pad 22, where it is engaged by the plunger 40 of an upwardly acting jack 4 resting upon the platform P, or upon a rocker pad, not shown.

In the arrangement shown in the drawings the parts are so assembled that upon the application of an upwardly acting force through the jack 4, upon the outwardly projecting arm 2 at the rear end of the rearwardly directed torque bar 1, there is produced a tendency to bend the spindle support arm A in a direction such that the camber is increased. If, however, the lever is engaged with the anchorage ears 14, instead of the ears 12, the lever arm 2 will project in the opposite direction, or inwardly in the set-up illustrated, and the upwardly acting force produced by the jack 4 will effect a bend in the spindle support arm such as will decrease the camber of the wheel. As is evident, if it is necessary to effect a decrease in camber, following an increase which has progressed too far, and which cannot be cured by adjustment of the built-in camber adjustment, it is only necessary to engage the lever arm 2 with the other set of ears 14, and to engage the jack with the lever, and thus to effect a reverse bend of the spindle support arm A.

In order to determine to what extent the bending has progressed, and to be able to come back to that attained position as a new zero position, in the event further bending is found to be necessary after gauging the wheel, there are provided gauge means in association with the torque bar and the hold-down means. Thus, a gauge finger 5 is carried by the torque bar 1, and co-operates with an index mark 50 upon the apertured upper end of the hold-down link part 3. The index finger 5 is adjustable angularly about the axis of the torque bar 1 by means of a slot 51 in its supporting plate 52, and a set screw 53 threaded in the torque bar.

In operation, after straddling the uppermost part of the spindle support arm A with the fork 11 of the torque bar, the opposite end of the torque bar is supported by the hold-down means from the platform P, and then the lever arm 2 is engaged with the appropriate pair of ears 12 and 14, and the jack is engaged beneath the outer end of the lever arm. Obviously any form of jack means may be employed, or any means to effect an upward force on the end of the lever arm. Slight pressure of the jack upon the pad 22 tensions the hold-down means 3, 30, and securely grips the spindle support arm A by the fork 11, preventing vertical or longitudinal shifting of the torque bar 1 relative to the spindle support arm.

After further application of force to an extent which experience indicates is sufficient to effect the desired bending of the spindle support arm A, the gauge finger 5 is set opposite the gauge mark 50 to indicate the attained position of the parts, and then the jack is relaxed. The jack being upright, it remains in proper operative relationship with the lever arm, should further bending be required. The wheel is gauged by wheel gauges of known type, to determine its camber. If its camber is still insufficient, assuming an increasing operation is being performed, the jack is caused to exert further bending force in the same sense, past the gauge point previously attained. If on the contrary the bending has progressed too far, it is necessary only to engage the lever arm 2 with the other set of ears, such as 14, to shift the jack into position to engage the lever's free end, and to effect reverse bending. A chain over the car frame, to a suitable hold-down anchorage, holds the car against lifting under the influence of reverse bending forces. In all cases parts can be restored to their attained position in accordance with the setting of the gauge members 5 and 50.

Because the torque bar 1 has a simple forked end at 11, and because it projects generally horizontally in a forward and rearward direction to a point distant from the spindle support arm A, it avoids most of the mechanism in the vicinity of the spindle support arm, and can be readily engaged with or disengaged from that support arm without disassembly of any parts of the car. It has been found in all cases that there is ample room for engagement and movement of the lever arm 2, without interference with parts of steering mechanism or of the automobile itself. The operation is a simple one, both to place the tool in operative position and to effect the bending operation, and it is also simple to effect reverse bending as required. Meanwhile all bending is under control of the gauge means 5 and 50, by which may be ascertained the extent of bending, and by which it is possible to replace parts in the position they assumed at the end of any preceding bend, as a starting point for further bending.

I claim as my invention:

1. Means for adjusting wheel camber, comprising a torque bar slotted inwardly from one end to straddle the spindle support arm, and when so engaged extending generally horizontally in a forward and rearward direction, means to retain the distant end of said torque bar against displacement, and a lever arm connected by one end to said bar outwardly of its torque axis, thence extending beneath and fulcrumed by said torque bar, for engagement of its opposite end by an upwardly acting jack to produce a bending torque in said torque bar, at the engaged spindle support arm.

2. The combination of claim 1, characterized in that the retaining means comprises an upright link apertured at its upper end to receive the end of the torque bar and having means at its lower end for securement to a fixed anchorage.

3. The combination of claim 1, characterized in that the retaining means comprises a two-part upright link apertured at its upper end to receive the end of the torque bar, and having means at its lower end for securement to a fixed anchorage, and means for adjustably securing together the two parts of said link, for different lengths.

4. The combination of claim 1, characterized in that the retaining means comprises a two-part upright link apertured at its upper end to receive the end of the torque bar, and having means at its lower end for securement to a fixed anchorage, the two parts being pivotally connected for swinging of the upper part relative to the lower part about an axis extending transversely of the car.

5. The combination of claim 1, characterized in that the retaining means comprises a lower part, having means for engagement with an anchorage to maintain it, unaided, in upright position, and an upper part adjustable vertically relative to the lower part, and hingedly connected thereto for swinging in a forward and rearward plane, relative to the car, and formed at its upper end for pivotal mounting of the end of the torque bar.

6. Means for adjusting wheel camber, comprising a torque bar slotted inwardly from one end to straddle the spindle support arm, and when so engaged extending generally horizontally in a forward and rearward direction, means to retain the distant end of said torque bar against displacement vertically, laterally, and lengthwise, a lever arm, two anchorage means on said torque bar engageable by said lever arm alternatively, with one for projection of said lever arm outwardly, or with the other for projection thereof inwardly, and in either case extending thence beneath and fulcrumed by the bar; for engagement of its opposite end by an upwardly acting jack to produce a bending torque in said torque bar, for respectively increasing or decreasing the wheel's camber by bending the engaged spindle support arm.

7. Means for adjusting wheel camber, comprising a torque bar slotted inwardly from one end to straddle the spindle support arm, and when so engaged extending generally horizontally in a forward and rearward direction, means to retain the distant end of said torque bar against displacement, a lever arm connected by one end to said bar outwardly of its torque axis, and thence extending beneath and fulcrumed by said torque bar, for engagement of its opposite end by an upwardly acting jack to produce a bending torque in said torque bar, at the engaged spindle support arm, and gauge means interacting between said torque bar and said hold-down means for determining the extent of the corrective bending.

8. The combination of claim 7, characterized in the provision of means for adjusting the gauge means to indicate any desired position of departure.

9. Means for adjusting wheel camber comprising a torque bar slotted longitudinally inwardly from one end to straddle the spindle support arm, and when so engaged extending generally horizontally in a forward and rearward direction, means to secure the distant end of said torque bar against displacement, anchorage means formed integrally with said torque bar and projecting laterally therefrom, and a lever arm removably secured to said anchorage means, outwardly from the torque bar's axis, and extending thence to a fulcrum at the under side of said torque bar, and beyond for engagement by an upwardly acting jack, to produce a bending torque in said bar, at the engaged spindle support arm.

10. The combination of claim 9, characterized in the provision of a second, oppositely projecting anchorage means on the torque bar, for alternative and similar engagement by the lever arm, to produce an opposite torque in the bar.

11. Means for adjusting wheel camber comprising a torque bar slotted longitudinally inwardly from one end to straddle the spindle support arm, and when so engaged extending generally horizontally and rearwardly, means to hold down the rear end of said torque bar, a pair of spaced ears projecting laterally from said torque bar, and a lever arm engageable by one end between said ears, and projecting thence beneath and laterally beyond the torque bar, for engagement of its opposite end by an upwardly acting jack, thereby to produce a bending torque in said torque bar, at the engaged spindle support arm.

12. Means for adjusting wheel camber comprising a torque bar slotted longitudinally inwardly from one end to straddle the spindle support arm, and when so engaged extending generally horizontally and rearwardly, means to retain the rear end of said torque bar against displacement, a pair of spaced ears projecting laterally from said torque bar, a lever arm engageable by one end between said ears, and projecting thence beneath and laterally beyond the torque bar, for engagement of its opposite end by an upwardly acting jack, thereby to produce a bending torque in said torque bar, at the engaged spindle support arm, an index finger extending longitudinally of said torque bar for cooperation with an index mark upon said hold-down means, and means to adjust said index finger angularly about the torque axis of said bar.

13. Means for bending spindle support arms, comprising a generally horizontal torque bar slotted inwardly from one end to engage the spindle support arm at two vertically spaced points respectively at the inner and outer sides of said spindle support arm, a lever arm supported from said torque bar at a point spaced outwardly from the axis of said torque bar, said lever arm extending thence transversely beyond and fulcrumed beneath the torque bar, whereby an upwardly acting force, by suitable jack means engaged with the lever's opposite end, produces a torque in the torque bar, acting between the two points of engagement with the spindle support arm, to bend the latter.

HOMER V. JUNGST.

REFERENCES CITED

The following references are of record in the file of this patent:

UNITED STATES PATENTS

| Number | Name | Date |
|---|---|---|
| 174,486 | Collingsworth | Mar. 7, 1876 |
| 2,153,367 | Holmes | Apr. 11, 1939 |
| 2,183,427 | Hou | Dec. 12, 1939 |
| 2,256,231 | Bender | Sept. 16, 1941 |
| 2,263,628 | Hinton | Nov. 25, 1941 |
| 2,308,428 | Ronning et al. | Jan. 12, 1943 |
| Re. 15,093 | Fullenwider | Apr. 26, 1921 |